United States Patent [19]

Cornu et al.

[11] 4,441,010

[45] Apr. 3, 1984

[54] PROCESS AND APPARATUS FOR THE LATERAL POSITIONING OF A MEMBER RELATIVE TO A JOINT

[75] Inventors: Jean Cornu, Nantes; Jean-Marie Detriche, Saint Germain en Laye; Pierre Gil, Bures sur Yvette; Paul Marchal, Gif-sur-Yvette; Jean Vertut, Issy les Moulineaux, all of France

[73] Assignee: Commissariat a l'Energie Atomique, Paris, France

[21] Appl. No.: 371,268

[22] Filed: Apr. 23, 1982

[30] Foreign Application Priority Data

Apr. 30, 1981 [FR] France ............................... 81 08671

[51] Int. Cl.³ .............................................. B23K 9/12
[52] U.S. Cl. ................. 219/124.34; 318/576
[58] Field of Search ...................... 219/124.34, 124.22; 318/576

[56] References Cited

U.S. PATENT DOCUMENTS

| | | | |
|---|---|---|---|
| 3,150,624 | 9/1964 | Brems | 219/124.34 |
| 3,484,667 | 12/1969 | Wofsey | 219/124.34 |
| 4,010,346 | 3/1977 | Cecil et al. | 219/125 |
| 4,125,943 | 11/1978 | Ando | 219/124.34 |

FOREIGN PATENT DOCUMENTS

| | | | |
|---|---|---|---|
| 36358 | 9/1981 | European Pat. Off. . | |
| 129182 | 1/1978 | German Democratic Rep. | 219/124.34 |
| 1584707 | 2/1981 | United Kingdom . | |

Primary Examiner—C. C. Shaw

[57] ABSTRACT

Process for the lateral positioning of a member relative to a joint formed between two metal surfaces and having discontinuities and using at least one eddy current probe, wherein the signal supplied by each of the probes are processed to obtain at least one positioning signal varying with the displacement of the axis of the corresponding probe relative to the axis of the joint and at least one signal indicating the presence of a discontinuity and transmitted when the corresponding probe faces a discontinuity of the joint, wherein the member is laterally displaced as a function of variations of the positioning signal and wherein the control of the displacement of said member is interrupted as a function of variations of the positioning signal when a signal indicating the presence of a discontinuity is transmitted.

The invention also relates to an apparatus for performing this process.

16 Claims, 17 Drawing Figures

PROCESS AND APPARATUS FOR THE LATERAL POSITIONING OF A MEMBER RELATIVE TO A JOINT

BACKGROUND OF THE INVENTION

The present invention relates to a process for the lateral positioning of a member relative to a joint formed between two metal surfaces and having discontinuities, as well as to an apparatus for performing this process.

More specifically, the present invention relates to the problem of the automatic lateral positioning of a member, such as a welding torch relative to the joint separating two members to be welded, when the latter are held in position by weld points made beforehand. These weld points are usually produced manually in a random manner, so that their spacing and shape vary. These weld points consequently form discontinuities of the joint formed between the two members, which are distributed in a random manner along the joint.

It is obvious that the presence of these weld points along the joint separating the two members to be welded may be prejudicial to the operation of a welding head equipped with an apparatus ensuring its automatic lateral positioning. Thus, the automatic positioning apparatus may lose the joint at the moment of passage of the weld point and will therefore guide the welding torch outside the working area.

These risks are particularly high when the automatic lateral positioning apparatus uses eddy current transducers, because the latter react in a very sensitive manner to the weld points constituting a discontinuity of the joint separating the metal surfaces, i.e. a short-circuit between the surfaces of the metal sheets to be welded. Therefore, the welding torch cannot be directly controlled as a function of the data supplied by the transducers, because this would lead to very significant position variations at the passage of the weld points.

Obviously, the application to the welding of two metal sheets is not limitative and the invention can be used for solving any lateral positioning problem of a member relative to a joint formed between two surfaces and having discontinuities.

To solve the difficulty mentioned hereinbefore, it is possible to envisage the recording of the position of the discontinuities along the joint during a prewelding operation. However, this operation is long and costly, so that it is considered inappropriate for the problem in question.

BRIEF SUMMARY OF THE INVENTION

The present invention relates to a process for the lateral positioning of a member, such as a welding torch relative to a joint formed between two metal surfaces and having discontinuities, such as weld points ensuring the prior positioning of the members, in such a way that the discontinuities are not prejudicial to the lateral positioning of the probe and without it being necessary to record the position of the discontinuities before carrying out the position of the actual member. The invention also relates to an apparatus for performing this process.

Therefore, the present invention proposes a process for the lateral positioning of a member relative to a joint formed between two metal surfaces and having discontinuities and using at least one eddy current probe, wherein the signal supplied by each of the probes are processed to obtain at least one positioning signal varying with the displacement of the axis of the corresponding probe relative to the axis of the joint and at least one signal indicating the presence of a discontinuity and transmitted when the corresponding probe faces a discontinuity of the joint, wherein the member is laterally displaced as a function of variations of the positioning signal and wherein the control of the displacement of said member is interrupted as a function of variations of the positioning signal when a signal indicating the presence of a discontinuity is transmitted.

According to a first embodiment of the invention, a single eddy current probe is used and the signal indicating the presence of a discontinuity is transmitted between two characteristic variations of the positioning signal.

According to a second embodiment of the invention, at least two eddy current probes are used, which are displaced in the direction of the joint.

According to a first variant of the second embodiment of the invention, the signal indicating the presence of a discontinuity is transmitted between two characteristic variations of the positioning signal of the first probe, the lateral displacement of the member being controlled as a function of variations of the positioning signal of the second probe.

According to a second variant of the second embodiment of the invention, the signals supplied by the first probe are processed to obtain a proximity signal, which varies with the distance separating the probe from the facing surface, the first probe is laterally displaced with the member as a function of variations of positioning signals supplied by the second probe in order to centre the first probe on the axis of the joint and the signal indicating the presence of a discontinuity is transmitted on the basis of variations of the proximity signal.

According to a third variant of the second embodiment of the invention, the signal indicating the presence of a discontinuity is transmitted when the difference between the positioning signals obtained on the basis of each of the probes exceeds a predetermined threshold.

In the first and second embodiments of the invention, on the basis of variations of the positioning signal before and after the transmission of a signal indicating the presence of a discontinuity, it is possible to determine a calculated positioning signal, the lateral displacement of the member then being controlled by means of a control signal, which is a function of the positioning signal in the absence of a signal indicating the presence of a discontinuity and a function of the calculated positioning signal when a signal indicating the presence of a discontinuity is transmitted. Preferably, the calculated positioning signal is then initially determined on the basis of variations of the positioning signal during a given period before a transmission of a signal indicating the presence of a discontinuity, and secondly on the basis of variations in the positioning signal during the same period after the end of the transmission of the signal indicating the presence of a discontinuity.

In the second embodiment of the invention, the calculation can be carried out on the basis of information supplied by the positioning probe, which is located in front of the torch in the displacement direction.

In the second embodiment of the invention, it is possible to directly control the displacement of the member by means of a positioning signal in the absence of a signal indicating the presence of a discontinuity, the control of the displacement being blocked with a certain time lag after the transmission of the signal indicating the presence of a discontinuity. This time lag can be determined either by a prior display, or on the basis of the displacement speed of the probes along the joint and the distance separating said probes. This type of processing can be used in the three variants of the second embodiments of the invention.

The invention also relates to an apparatus for the lateral positioning of a member relative to a joint formed between two metal surfaces and having discontinuities enabling the performance of the aforementioned process.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
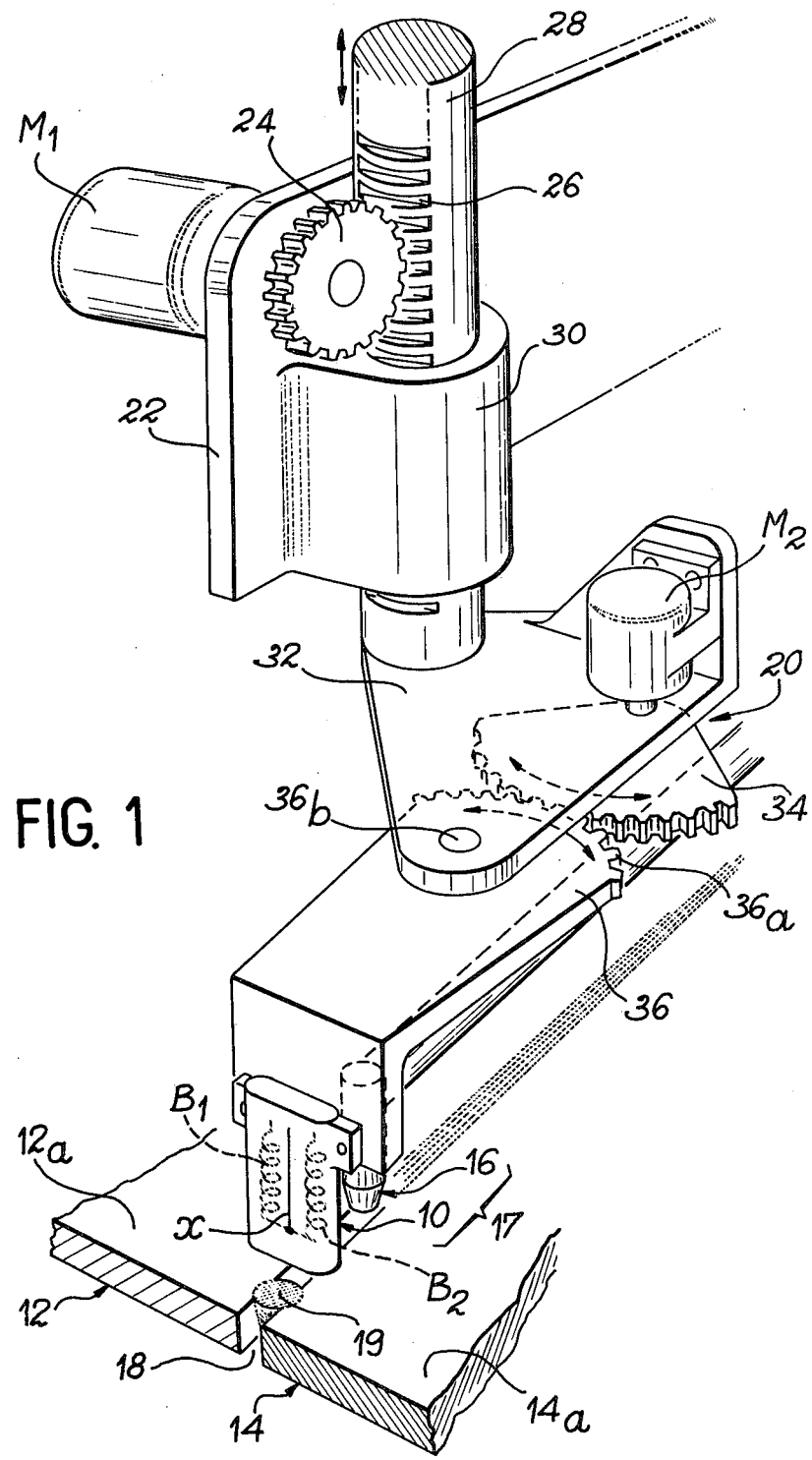
FIG. 1 a diagrammatic perspective view showing an apparatus according to the invention permitting both the heightwise regulation of a welding torch relative to two metal sheets to be welded and the positioning of said torch facing the joint formed between the two sheets.

The apparatus according to the invention comprises an eddy current detector 10 which, in the simplest case, is an eddy current probe, as illustrated in FIG. 1.

It is pointed out that such a probe is based on the principle of supplying a coil with a high frequency sinusoidal current, so as to produce an alternating field inducing in an electricity-conducting material member facing the probe eddy currents and, during the return path, a field opposing the initial field and modifying the impedance of the coil. Thus, the variants of the impedance of the coil give an indication of the arrangement thereof relative to the facing member and of the presence of a joint on said member.

In order to be able to carry out a differential measurement making it possible to determine the positioning of the probe relative to a joint 18 formed on surfaces 12a, 14a of members 12 and 14 to be welded, the probe has two coils, $B_1$, $B_2$, whose axes are located in the same plane and which are arranged symmetrically with respect to an axis x defining the axis of the probe. In the constructional variant of FIG. 1, the axes of the two coils $B_1$ and $B_2$ are parallel, in such a way that they are both equidistant with respect to axis x.

Obviously, other constructional variants can be envisaged. In general terms, any arrangement of coils $B_1$ and $B_2$ leading to a symmetry of the eddy currents induced can be used. In practice, this means that coils $B_1$ and $B_2$ are symmetrical with respect to axis x. Thus, the axes of coils $B_1$ and $B_2$ can be parallel and located in a plane normal to joint 18, in the manner illustrated in FIG. 1. They can also be inclined in this plane so as to intersect along axis x and form a given angle with the latter. Coils $B_1$ and $B_2$ can also be arranged in the same plane in accordance with one or other of the aforementioned arrangements, said plane being inclined relative to the normal to surfaces 12a, 14a and intersecting the surfaces along a line perpendicular to joint 18. Coils $B_1$ and $B_2$ can also be positioned in symmetrical planes with respect to the plane normal to the surfaces, perpendicular to the joint, said planes intersecting the surfaces along a line perpendicular to the joint.

It can be seen from FIG. 1 that the welding torch 16 to be positioned is mechanically rigidly connected to detector 10 in order to form with the latter the actual welding head 17. The distance between the detector and the torch is such that joint 18 can be locally considered as a straight line. Thus, the distance decreases in proportion to the minimum radius of curvature of the joint to be welded. This distance is also determined as a function of the desired precision.

FIG. 1 shows in exemplified manner the mechanical means permitting the positioning of head 17 relative to the two metal sheets 12, 14 to be welded and which define between them joint 18, which must be followed by welding torch 16. Although sheets 12 and 14 are planar and joint 18 is rectilinear in the drawing, it is obvious that the invention can be used no matter what the shapes of the sheets and the joint.

In particular, and as will be seen hereinafter, the invention can be used with particular advantage in the case when sheets 12 and 14 are held in position by weld points, such as point 19, made beforehand in a generally random manner.

In the embodiment of FIG. 1, welding head 17 is carried by a mechanism 20 ensuring both its heightwise positioning relative to surfaces 12a and 14a and its lateral positioning relative to joint 18.

The positioning mechanism 20 of the welding head comprises a support arm 22 connected to a (not shown) moving carrying means permitting the welding head to move along joint 18. Arm 22 supports an electric motor $M_1$, whose horizontal output shaft is fixed to a pinion 24, which meshes in a rack 6 formed on a vertical column 28 guided by a sleeve 30 integral with arm 22, so as to be able to move from bottom to top and top to bottom under the action of motor $M_1$. This first assembly permits the heightwise positioning of welding head 17 relative to joint 18.

At its lower end, column 28 carries a horizontal plate 32, which supports a second motor $M_2$, whose vertical output shaft rotates a toothed circular sector 34, which meshes with another toothed sector 36 which, like sector 34, is pivotably mounted beneath the plate 32. Detector 10 and welding support 16 constituting welding head 17 are fixed to the toothed sector 36 on the side opposite to teeth 36a of the latter with respect to the pivot pin 36a, the spindles of the detector and the torch being aligned with pivot pin 36b. As is shown in FIG. 1, detector 10 is placed in front of the welding torch in the displacement direction of head 17. This second assembly makes it possible to laterally displace head 17 with respect to joint 18.

Figure 2:
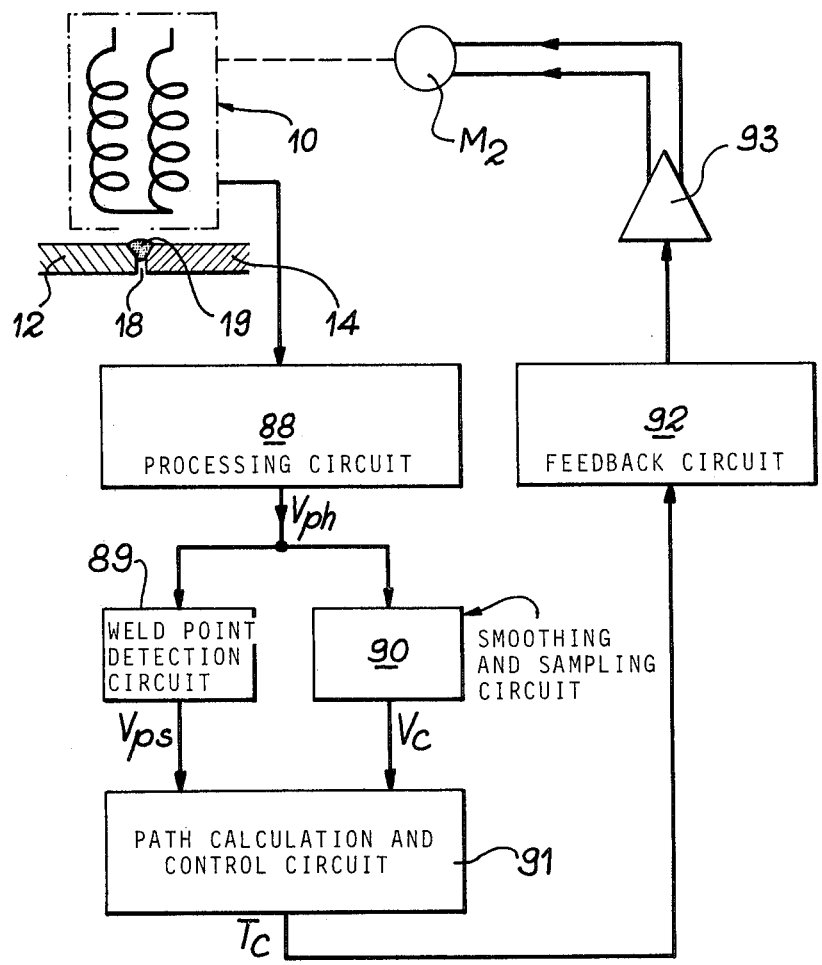
FIG. 2 diagrammatically, a first embodiment of the servocontrol or feedback circuit ensuring the lateral positioning of the welding head of FIG. 1 when the weld points have been made beforehand in the joint separating the two metal sheets to be welded.

Besides the welding head 17 and mechanism 20, the positioning apparatus according to the invention comprises, in the first embodiment shown in FIG. 2, an electronic processing circuit 88 into which are injected the signals from probe 10. Processing circuit 88 supplies a signal $V_{ph}$ which is simultaneously injected into a weld point detection circuit 88 and into a smoothing and sampling circuit 90.

As will be shown in greater detail hereinafter, circuit 89 supplies a signal $V_{ps}$ indicating the presence of a weld, when the probe 10 detects the presence of a weld point 19 on joint 18 separating metal sheets 12, 14. Moreover, circuit 90 transforms the continuous signal $V_{ph}$ into a digital signal $V_c$ constituted by a succession of smoothed voltage steps and intended, as will be shown hereinafter, to permit the performance of certain digital functions, e.g. by means of microprocessors.

Signal $V_c$ and, when it exists, signal $V_{ps}$ are respectively transmitted to a path calculation and control circuit 91, which will be described in detail hereinafter relative to FIG. 7. Circuit 91 also comprises filtering means making it possible to store at the output a continuously varying control signal $T_c$. The latter is transmitted to a known servocontrol or feedback circuit 92, whose output signal is injected into a power amplifier 93, which controls the motor $M_2$ for ensuring the lateral positioning of probe 10 by means of the mechanism of FIG. 1.

Figure 3:
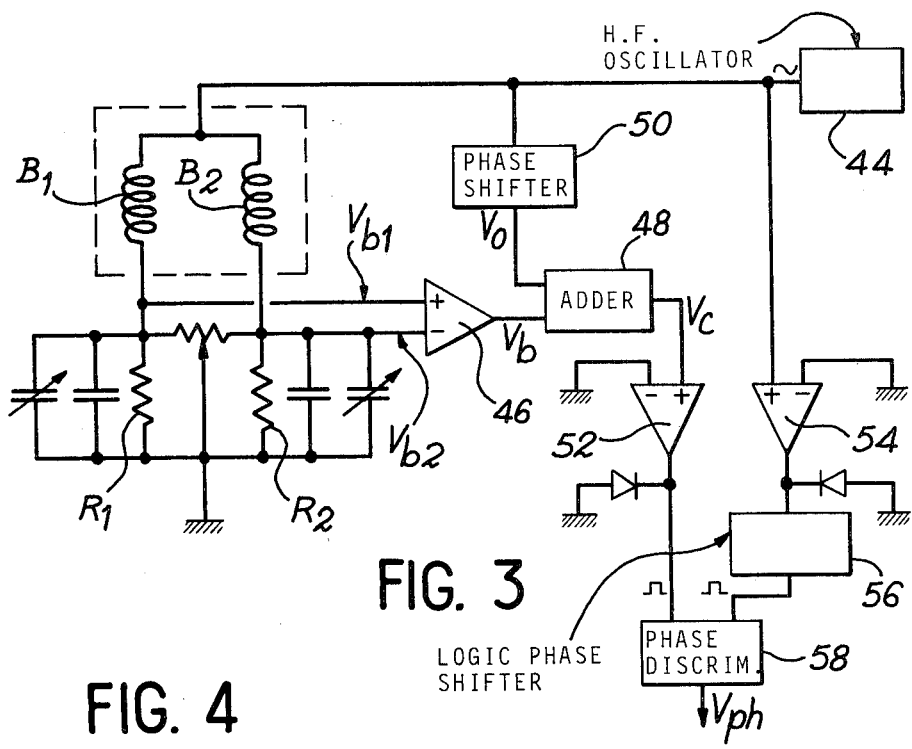
FIG. 3 the processing circuit based on phase differences of the signal supplied by the eddy current probe used in the apparatus of FIG. 1, the processing circuit being used in the feedback circuit of FIG. 2.

FIG. 3 shows the electronic processing circuit 88 of the signals supplied by the eddy current probe 10. This circuit makes it possible to perform a differential measurement usable for the lateral positioning of the welding head on the weld line.

In order to permit detection of variations of the impedance of each of the coils $B_1$ and $B_2$ of the probe, the latter are placed in a symmetrical measuring bridge, whereof the two branches $R_1$ and $R_2$ ensure the equilibrium. The thus formed measuring bridge is supplied between the high point defined by the junction of coils $B_1$ and $B_2$ and the low point defined by the junction of branches $R_1$, $R_2$ by a high frequency sinusoidal signal (e.g. 240 kHz) from a h.f. oscillator 44. The sinusoidal output signals $V_{b1}$ and $V_{b2}$, taken respectively at the common terminals of branches $B_1,R_1$ and $B_2,R_2$ are respectively transmitted to the positive terminal and negative terminal of a differential amplifier 46, which supplies a sinusoidal signal $V_b$. Signal $V_b$ is injected into an adder 48 with a signal $V_o$, which corresponds to the signal injected into the measuring bridge by oscillator 44 and phase shifted by $\pi/2$ by a phase shifter 50. The sinusoidal signal $V_c$ supplied by adder 48 is injected at the positive terminal of a comparator 52, whose negative terminal is connected to earth. In the same way, the sinusoidal signal supplied by oscillator 44 is injected at the positive terminal of another comparator 54, whose negative terminal is also connected to earth. Comparators 52 and 54 supply positive logic signals for the positive alternations of the sinusoidal signals injected into them. The logic signal supplied by comparator 54 represents the alternations of the sinusoidal signal supplied by oscillator 44. It is injected into a logic phase shifter 56 supplying a signal phase shifted by a given value compared with the input signal. This phase shifted signal is in turn injected into a phase discriminator 58, at the same time as the signal supplied by comparator 52, the latter representing the value of the signals at the terminals of coils $B_1$ and $B_2$. Phase discriminator 58 supplies a signal $V_{ph}$ representing the phase difference between the signal injected into the bridge and that at the terminals of the coils.

Figure 4:
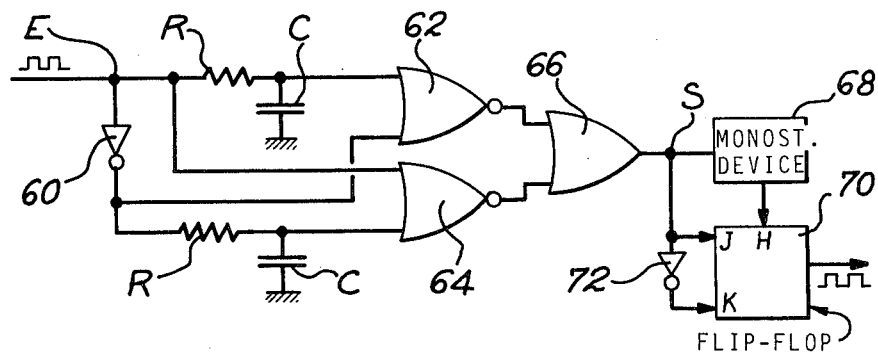
FIG. 4 the logic phase shifting circuit used in the processing circuit of FIG. 3.

As shown in FIG. 4, the logic phase shifter 56 comprises an inverter 60 and two RC circuits making it possible to delay the signal injected at E into the phase shifter and the signal leaving inverter 60. The signal injected into the phase shifter and delayed by one of the RC circuits, as well as the signal leaving inverter 60 are injected into a first NOR gate 62. In the same way, the signal injected at E into phase shifter 56, as well as the signal leaving inverter 60 and delayed by the second RC circuit are injected into a second NOR gate 64. The signals supplied by each of the NOR gates 62, 64 are injected into an OR gate 66, supplying at S a logic signal, whereof each pulse corresponds to the start and finish of a square wave pulse at the signal injected at the input E of phase shifter 56. This logic signal is injected at the input of a monostable device 68, at the input J of a flip-flop Jk 70 and, via an inverter 72, at the input K of the latter. The output signal of the monostable device 68, corresponding to a sequence of square wave pulses of predetermined duration starting with a given time lag compared with each pulse of the signal supplied at S, is injected at the input H of flip-flop Jk, whose output signal supplied at Q is identical to the signal injected at input E of the phase shifter, but phase shifted in accordance with a value determinated by a time lag imposed by monostable device 68. This output signal is injected into the phase discriminator 58.

Figure 5:
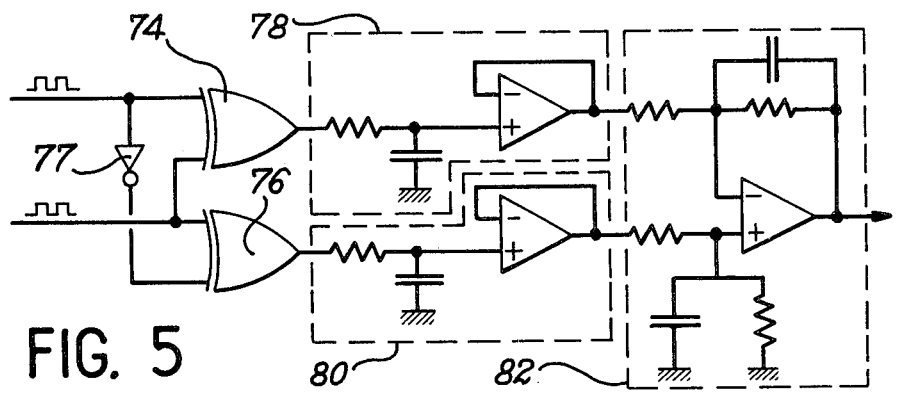
FIG. 5 the phase discriminating circuit used in the processing circuit of FIG. 3.

As shown in FIG. 5, the two inputs of phase discriminator 58 are connected on the one hand to an EXCLUSIVE-OR gate 74 and on the other to an EXCLUSIVE-OR gate 76 after the signal from the logic phase shifter 56 has passed through an inverter 78. The output of each of the EXCLUSIVE-OR gates 74, 76 is connected to an integrator 78,80, whose output signals representing the continuous component of each of the signals injected at the input of the phase discriminator, are injected into a subtractor 82 supplying the continuous output signal $V_{ph}$, whose value corresponds to the phase difference between the signal supplied by the phase shifter 56 and the signal from comparator 52.

Figure 6:
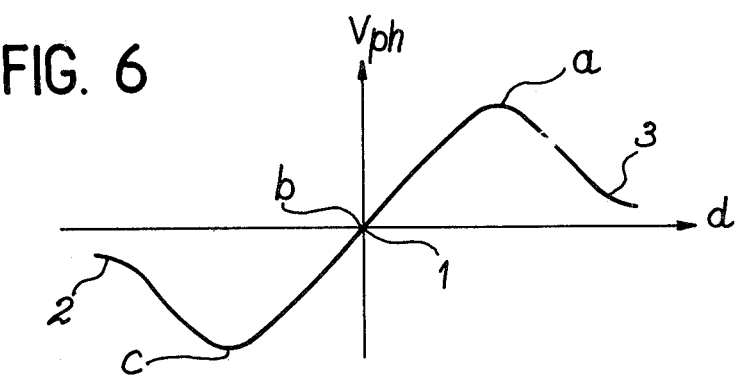
FIG. 6 the variations of the signal $V_{ph}$ supplied by the processing circuit of FIG. 3 as a function of the lateral displacement d of the probe with respect to the joint separating the sheets to be welded.

The variations of the signal $+V_{ph}$ supplied by the processing circuit described hereinbefore with reference to FIGS. 3 to 5 as a function of the lateral displacement d of axis a of the probe relative to the centre of joint 18 are shown in FIG. 6. It is pointed out that the corresponding displacement of probe 10 is obtained by motor $M_2$ of FIG. 1. The curve of FIG. 6 is remarkable on the one hand because signal $V_{ph}$ becomes zero when the displacement d is zero, and on the other hand because signal $V_{ph}$ is positive when the probe is displaced to one side relative to the joint and negative when the probe is displaced to the other side relative to the joint. These two features of the curve of FIG. 6 make it possible to fix the position and displacement direction of the probe relative to the joint. Thus, when the probe moves transversely with respect to joint 18 and from left to right in FIG. 1, signal $V_{ph}$ passes from a negative voltage to a positive voltage.

It should be noted that the curve of FIG. 6 is plotted in the case when the phase displacement between the two signals applied to the phase discriminator 58 is regulated in such a way that voltage $V_{ph}$ is zero when the centre of joint 18 is placed precisely in the extension of axis x of probe 10. This phase displacement is regulated by means of a logic phase shifter 56 by appropriately controlling the pulses supplied by the monostable device 68 and particularly the time lag of said pulses relative to the pulses supplied at S by the OR gate 66. Thus, the phase displacement of the signal supplied by the oscillator by means of the logic phase shifter 56 makes it possible to place said signal in phase quadrature with the signal supplied by comparator 52 when axis x of the probe passes through the centre of joint 18. This leads to a zero output signal $V_{ph}$ of the phase discriminator 58 in this position.

It can also be seen that the curve of FIG. 6 is more or less flat, depending on the value of the distance h separating probe 10 from surfaces 12a and 14a. Thus, the sensitivity and consequently the accuracy of locating the joint increase when the probe is closer to the surface of the sheets. Conversely, the measurement is no longer significant beyond a certain distance, which varies with the nature of the member and e.g. the operating frequency (under special experimental conditions this distance has been about 15 mm). Conversely, the width of the joint to be detected has virtually no influence on the positioning of the probe, provided that compatibility is ensured with the size of the detector (distance between the coils).

In normal operation, i.e. when there is no weld point 19, distance d remains sufficiently small for the point representing the position of probe 10 to remain in the vicinity of the zone 1 in FIG. 6. However, when the transducer passes onto a point which can be likened to a metallic discontinuity such as a weld point, the response of the transducer suddenly passes from zone 1 to zone 2 or to zone 3 in FIG. 6, the latter zones corresponding to the response of the probe in the case of a continuous sheet. It is obvious that this rapid variation of the characteristic $V_{ph}$ can be detected and can be used by detection circuit 89.

Figure 7:
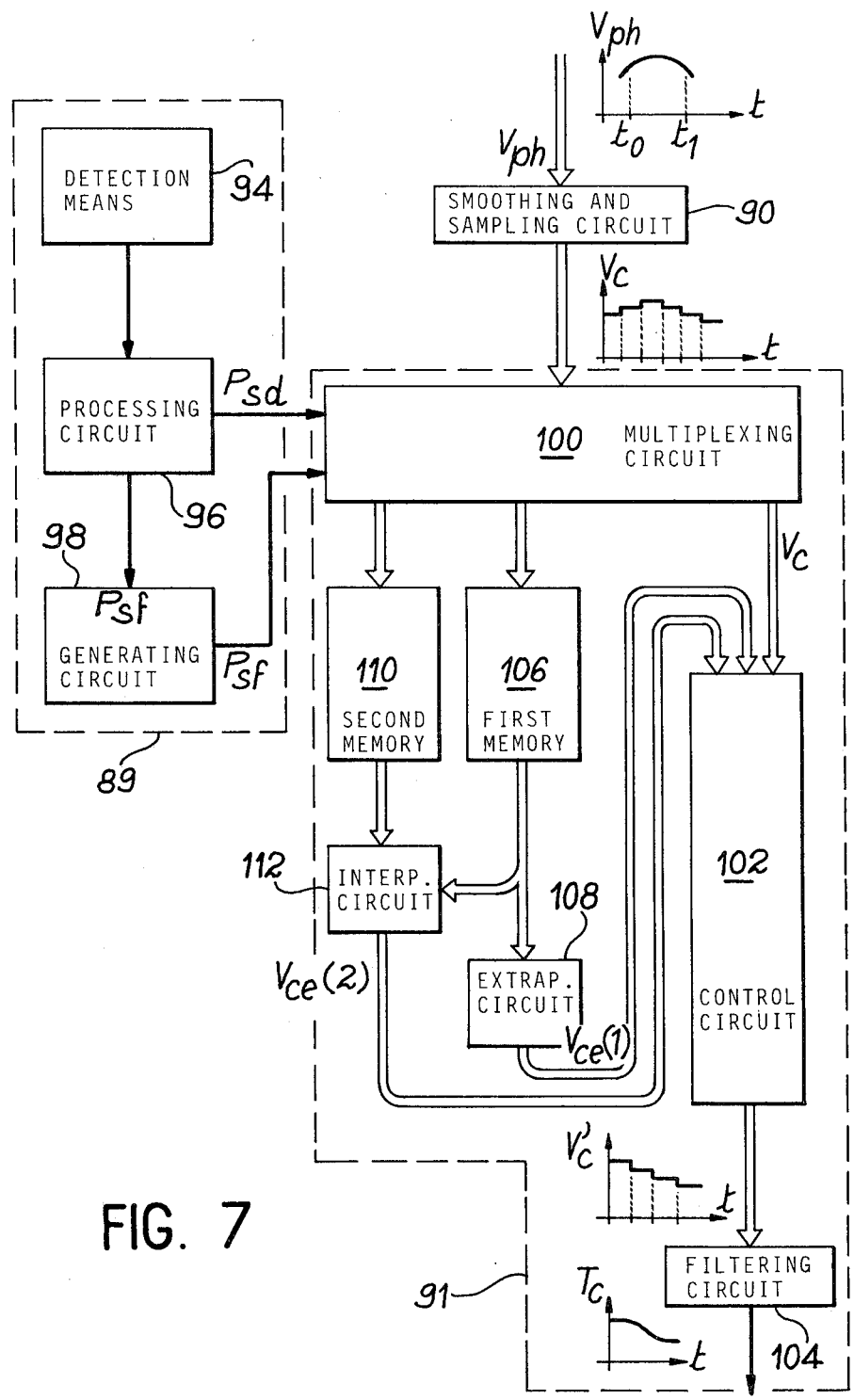
FIG. 7 diagrammatically, the weld point detection circuit, the path calculation circuit and the control circuit used in the feedback circuit of FIG. 2.

With reference to FIG. 7, a more detailed description will now be given of the elements constituting the weld point detection circuit 89, the smoothing and sampling circuit 90 and the path calculation and control circuit 91. Thus, detection circuit 89 comprises detection means 94, which are sensitive to the characteristic variations of signal $V_{ph}$ as a function of the distance d between zone 1 and one or other of the zones 2 and 3 in order to supply, via a processing circuit 96, a signal $P_{sd}$ representing the start of a discontinuity of the joint. The detection means 94 are also sensitive to a characteristic variation of signal $V_{ph}$ from one or other of the zones 2 and 3 to zone 1 in FIG. 6 for supplying via a circuit 98 a signal $P_{sf}$ representing the end of a discontinuity of a joint.

Signals $P_{sd}$ and $P_{sf}$ are injected into a multiplexing circuit 100 with the digital signal $V_c$ supplied by the smoothing and sampling circuit 90. It can be seen in FIG. 7 that the circuit 90 transforms the continuous signal $V_{ph}$ into a digital signal $V_c$ constituted by a succession of voltage steps injected into the multiplexing circuit 100. When there is no discontinuity of the joint, i.e. after the transmission of a signal $P_{sf}$, digital signal $V_c$ is directly transmitted by multiplexing circuit 100 to a control circuit 102, which then supplies a digital output signal $V'_c$ identical to signal $V_c$, but transmitted with a certain time lag compared with the latter in order to take account of the displacement existing between the measuring probe and the welding torch. Digital signal $V'_c$ is then transformed into a continuous signal $T_c$ in a filtering circuit 104 before being injected into the feedback circuit 92, as shown in FIG. 2.

Figure 8:
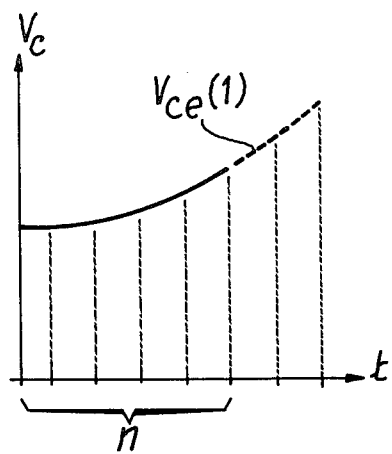
FIG. 8 variations of the control signal $V_c$ supplied by the control circuit of FIG. 7 before and after the transmission of a signal indicating the presence of a discontinuity by the weld point detection circuit.

When circuit 89 detects a discontinuity, i.e. when a signal $P_{sd}$ is transmitted by circuit 96, a given number d of samples of signal $V_c$ preceding the transmission of signal $P_{sd}$ is branched by the multilexing circuit 100 towards a first memory 106. These n samples are transmitted to an extrapolation circuit 108, which supplies the first part $V_{ce}(1)$ of the calculated positioning signal $V_{ce}$, as is shown in broken lines in FIG. 8.

Figure 9:
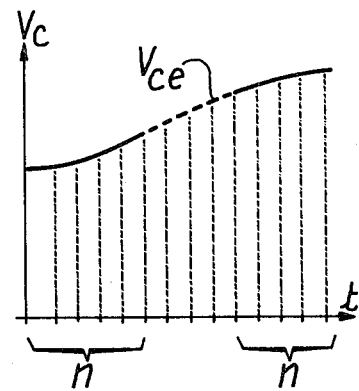
FIG. 9 a view comparable to FIG. 8 showing the variations of signal $V_c$ before, during and after the transmission of a signal indicating the presence of a discontinuity by the weld point detection circuit.

When a signal $P_{sf}$ representing the end of a discontinuity is transmitted by circuit 98, multiplexing circuit 100 injects into a second memory 110 the n first samples of signal $V_c$ following the transmission of said signal $P_{sf}$. The two series of signals stored in memories 106 and 110 are then injected into an interpolation circuit 112, which supplies the second part $V_{ce}(2)$ of the calculated positioning signal $V_{ce}$. As shown by broken lines in FIG. 9, the calculated positioning signal $V_{ce}$ obtained successively by means of circuits 108 and 112 makes it possible to replace the positioning signal $V_c$ (shown in unbroken lines) at a discontinuity of the joint. The two parts of signal $V_{ce}$ successively transmitted by circuits 108 and 112 are injected into control circuit 102 in place of positioning signal $V_c$ when a discontinuity is detected by circuit 89. In connection with the output signal $V'_c$ supplied by circuit 102, then signal $T_c$ ensuring the control of the feedback means 92, everything takes place as if the joint which has to be followed by the welding torch has no discontinuity.

Figure 10:
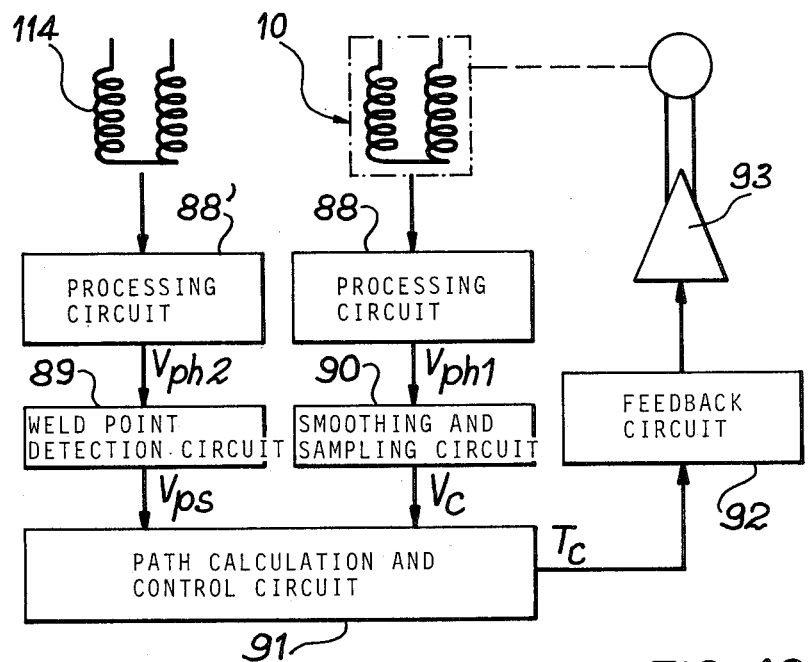
FIG. 10 a second embodiment of the servocontrol or feedback circuit ensuring the lateral positioning of the welding head according to the invention, in which a weld point detection probe is associated with the positioning probe.

With reference to FIG. 10, a first variant of the second embodiment of the invention will now be described in which a discontinuity detection probe 114 is positioned downstream of the lateral positioning probe 10, on considering the normal displacement direction of the welding head. Probe 114 is of the same type as probe 10 and also has two coils. The different orientation possibilities of this probe relative to the joint on which positioning is to take place, will be examined in greater detail hereinafter.

In the first variant of FIG. 10, a control and feedback circuit incorporating a weld point detection probe separate from the actual positioning probe, the signal supplied by the latter is processed by phase differences in a processing circuit 88 identical to the circuit described hereinbefore with reference to FIGS. 3 to 5. Signal $V_{ph1}$ supplied by the processing circuit is also injected into a smoothing and sampling circuit 90 similar to the smoothing and sampling circuit of the first embodiment supplied relative to FIG. 2. The digital signal $V_c$ from circuit 90 is transmitted to a path calculation and control circuit 91 similar to the path calculation and control circuit described with reference to FIG. 7. Signal $T_c$ supplied by circuit 91 ensures the control of motor $M_2$, as in the case of the circuit of FIG. 2, via a feedback circuit 92 and a power amplifier 93.

Apart from the addition of a weld point detection probe 114, the circuit of FIG. 10 differs from the circuit of FIG. 2 in that the signal supplied by probe 114 is processed in a processing circuit 88', which in this case is similar to circuit 88 described with reference to FIGS. 3 to 5. Signal $V_{ph2}$ supplied by circuit 88' is injected into a weld point detection circuit 89, which can be of the same type as that described with reference to FIG. 7.

It can be seen that the circuit described hereinbefore with reference to FIG. 10 is substantially identical to that of FIG. 2, except that in place of using the signal transmitted by probe 10 both for carrying out the lateral positioning of the welding head and for detecting the weld points connecting the sheets to be welded, the latter function is performed by means of an additional probe 114, which requires the provision of a supplementary processing circuit 88' or multiplexing, as a result of which only a single processing circuit 88 has to be used.

Figure 11:
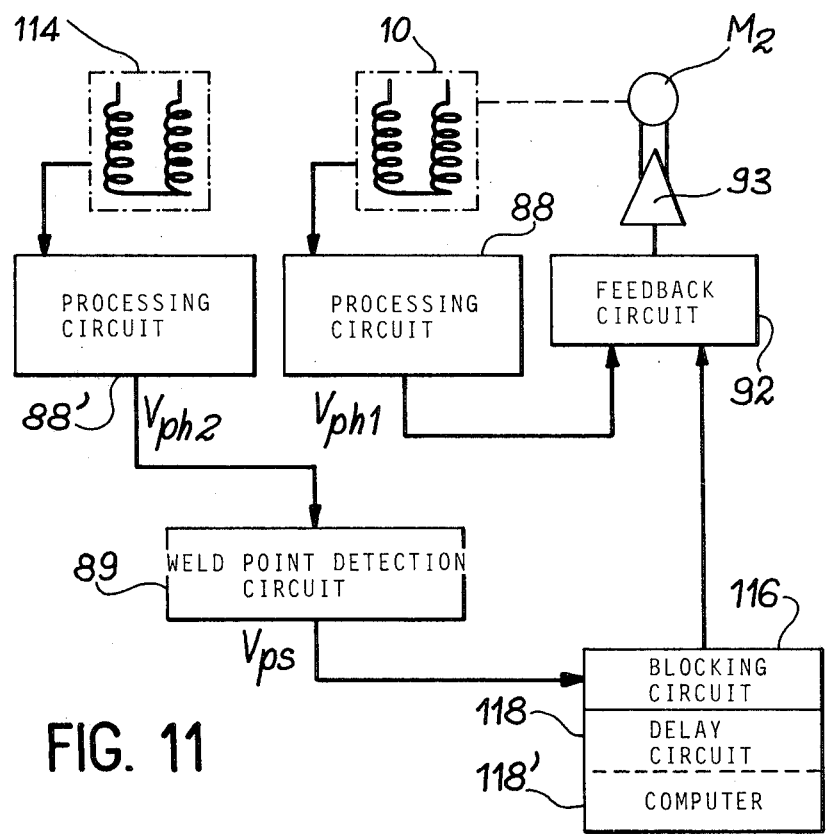
FIG. 11 a variant of the feedback circuit of FIG. 10.

FIG. 11 diagrammatically illustrates a second variant of the second embodiment of the invention, according to which two separate probes are used for ensuring the lateral positioning of the welding head and for detecting the weld points. In this second variant, it can be seen that the signal supplied by the positioning probe 10 and processed in circuit 88 for obtaining the signal $V_{ph1}$ is directly used for controlling the feedback circuit 92. The latter acts on motor $M_2$ via a power amplifier 93, as in the previous embodiments.

In this embodiment, as the feedback or servocontrol of the welding head is directly controlled on the basis of signal $V_{ph1}$, either on an analog, or on digital bases, it is necessary to block the control of the servocontrol or feedback when transducer 10 passes over a weld point. To this end, signal $V_{ps}$ from the weld point detection circuit 89 between two characteristic variations of signal $V_{ph2}$ supplied by processing circuit 88' connected to the weld point detection probe 114 is injected into a blocking circuit 119, whose output signal acts on the feedback circuit 92 in order to block the latter.

In view of the fact that there is a certain lag between probe 114 and probe 10, the blocking signal supplied by circuit 116 must be supplied an instant $\Delta T$ after the probe 114 has passed above the weld point. This instant $\Delta T$ is equal to the ratio between the distance separating transducer 114 and transducer 10 and the speed at which the welding head advances along the joint. If this advance speed is known and is sufficiently constant, it is possible to calculate once and for all the time lag $\Delta T$ and display it on a delay circuit 118 associated with blocking circuit 116. It is also possible to constantly measure the displacement speed of the welding head and determine the lag $\Delta T$ in an appropriate circuit 118'. In this case, circuit 118' is associated with blocking circuit 116 in place of the delay circuit 118. It should be noted that the blocking of feedback circuit 92 has the effect of maintaining the latter at the final value of signal $V_{ph1}$ injected into it prior to blocking.

In the two variants of the second embodiment described hereinbefore with reference to FIGS. 10 and 11, the weld point detection transducer or probe 114 can be positioned either longitudinally or transversely with respect to the joint. Moreover, said two variants, which more specifically relate to the processing of signal $V_{ph1}$ obtained from positioning probe 10 and signal $V_{ps}$ representing the presence of a discontinuity of joint 8 for controlling the displacement of the welding head, can be combined with different constructional variants of the weld point detection probe 114 and the weld point detection circuit 89.

A description will now be given with reference to FIGS. 12 to 17 of variants of probe 114 and circuit 89, which can be used in the circuits of FIGS. 10 and 11, according to the second embodiment of the invention.

Figure 12:
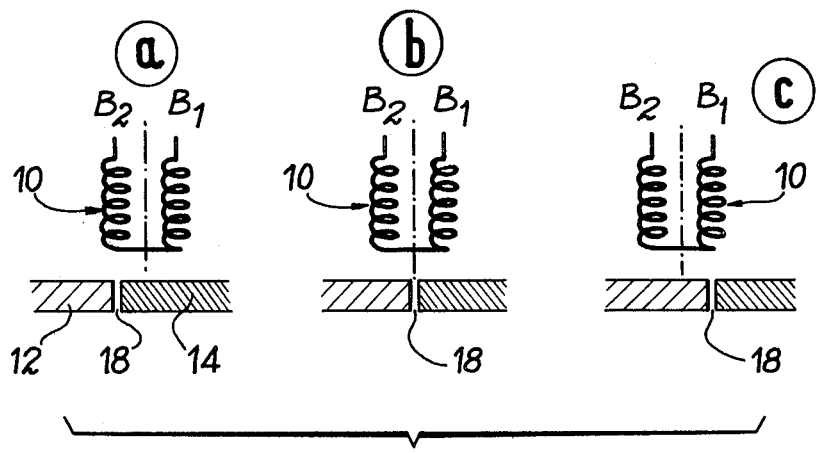
FIG. 12 at a, b and c three positions of an eddy current probe comprising two coils located in a plane perpendicular to the joint separating the two sheets to be welded, whereby said probe can be the lateral positioning probe on the apparatus of FIG. 1.

In FIGS. 12, a, b and c represent three particular positions of the positioning probe and, corresponding to points a, b and c on the characteristic of FIG. 6. More specifically, it can be seen that the positions represented at a and c in which one of the coils $B_1$, $B_2$ of the probe is disposed in the alignment of the joint correspond to the extreme values of signals $V_{ph}$ supplied by the processing circuit 88, whereas position b in which probe 10 is positioned symmetrically with respect to the joint corresponds to a zero value of signal $V_{ph}$ corresponding to the aforementioned zone 1.

Figure 13:
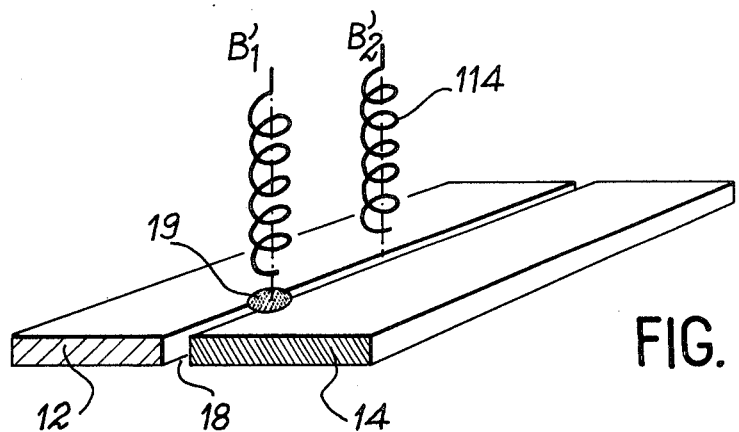
FIG. 13 a diagrammatic perspective view of an eddy current probe comprising two coils arranged longitudinally relative to the joint separating the two sheets to be welded, whereby said probe can be a weld point detection probe.

On referring to FIG. 13, which shows a detection probe 114, whose two coils $B'_1$, $B'_2$ are located in the plane of the joint, it can be seen that for the said probe everything takes place as if it were in the position a of probe 10 when the first coil of the probe faces a weld point, whilst the second coil is still facing the joint and then in position b of probe 10 when the two coils of probe 114 face the weld point and finally in position c of the probe 10 when the first coil of probe 114 is again opposite the joint, whereas the second coil is still facing the weld point.

Figure 14:
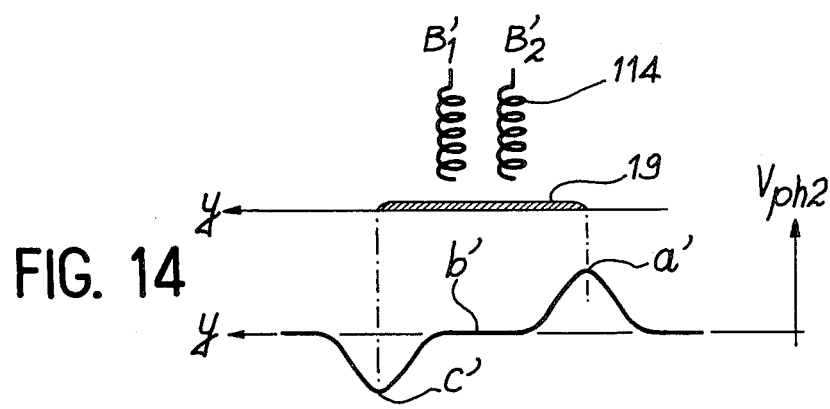
FIG. 14 variations of the signal $V_{ph2}$ transmitted by the processing circuit of FIG. 3 associated with an eddy current probe, like that of FIG. 13, when the said probe moves along a joint having a weld probe.
Figure 15:
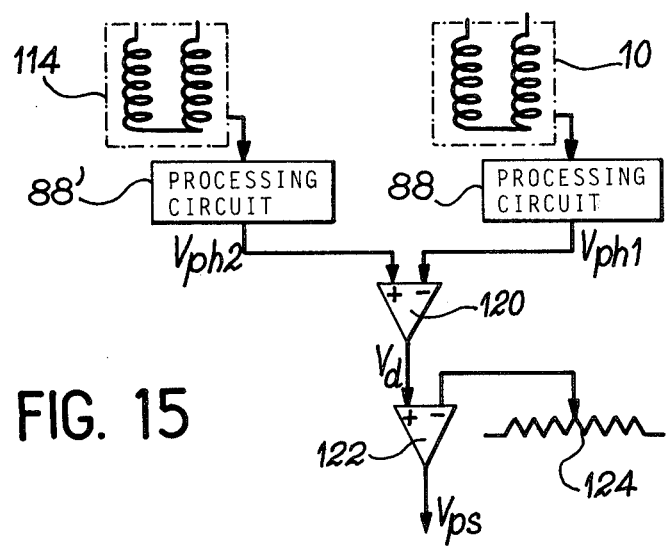
FIG. 15 diagrammatically, a variant of a weld point detection circuit which can be used in the feedback circuits of FIGS. 10 or 11.

This characteristic can be clearly seen in FIG. 14, which represents the variations of the signal $V_{ph2}$ supplied by circuit 88' associated with the weld point detection probe 114 as a function of the displacement Y of said probe along joint 18, when there is a weld point 19 on the path of the probe. In this case, it is possible to see that the weld point detection circuit 89 must supply the weld point starting signal $P_{sd}$ (FIG. 7) when the peak a' corresponding to the first coil of probe 114 arriving in front of weld point 19 appears and must then supply the weld point end signal $P_{sf}$ (FIG. 7) when the peak c' corresponding to the first coil of probe 114 arriving in front of joint 18 beyond weld point 19 appears.

In another variant, the weld point detection probe 114 can be positioned transversely to the joint, like the positioning probe 10. The detection of the weld points can then take place in two different ways.

According to a first embodiment, the detection of the weld points takes place directly on the basis of the curve of FIG. 6 corresponding to signal $V_{ph2}$ supplied by processing signal 88', which receives the signal transmitted by the detection probe 114. Detection circuit 89 then detects the characteristic passage from zone 1 to one or other of the zones 2 and 3 of the curve of FIG. 6. The detection is then completely identical to that carried out on the basis of a single probe 10 in the embodiment of FIG. 2.

In a second processing procedure for the signals supplied by the two probes 114 and 10 positioned transversely with respect to the joint, simultaneous use is made of the signal supplied by each of the probes for transmitting the signal indicating the presence of a weld joint $V_{ps}$. This processing mode is diagrammatically shown in FIG. 15 in which the signals $V_{ph1}$ and $V_{ph2}$ supplied respectively by processing circuits 88, 88' each associated with probes 10, 114 are injected into a subtractor 120, which supplies an output signal $V_d$ representing the difference between signals $V_{ph1}$ and $V_{ph2}$, said signal $V_d$ being injected into a comparator 112 on which is displayed beforehand a threshold predetermined by means of a potentiometer 124 or any similar device. It is clear that comparator 122 supplies no signal when signal $V_d$ is below the predetermined threshold and the signal indicating the presence of a weld point $V_{ps}$ is not supplied when signal $V_d$ exceeds this threshold.

In a final constructional variant of the weld point detection circuit and detection probe, the weld point detection transducer 114' only has a single coil and the associated processing circuit 88' now supplies a signal representing the distance h separating the probe from the facing surface instead of a signal representing the lateral positioning of the probe relative to the joint, as in the case of the circuit of FIGS. 3 to 5. Obviously, probe 114', like probe 114, described hereinbefore, is carried by the welding head 17 in such a way that it is automatically centred on joint 18 with probe 10 and torch 16. This processing circuit associated with the probe 114' is shown with the coil b thereof in FIG. 16. This processing circuit is substantially identical to the circuit of FIG. 3, so that reference can be made to the description of the latter, whilst bearing in mind the fact that the references are now supplemented by an apostrophe compared with FIG. 3. In the same way, logic phase shifter 56' and phase discriminator 58' are identical to the phase shifter 56 and discriminator 58 shown respectively in FIGS. 4 and 5, so that they will not be described again here.

Figure 16:
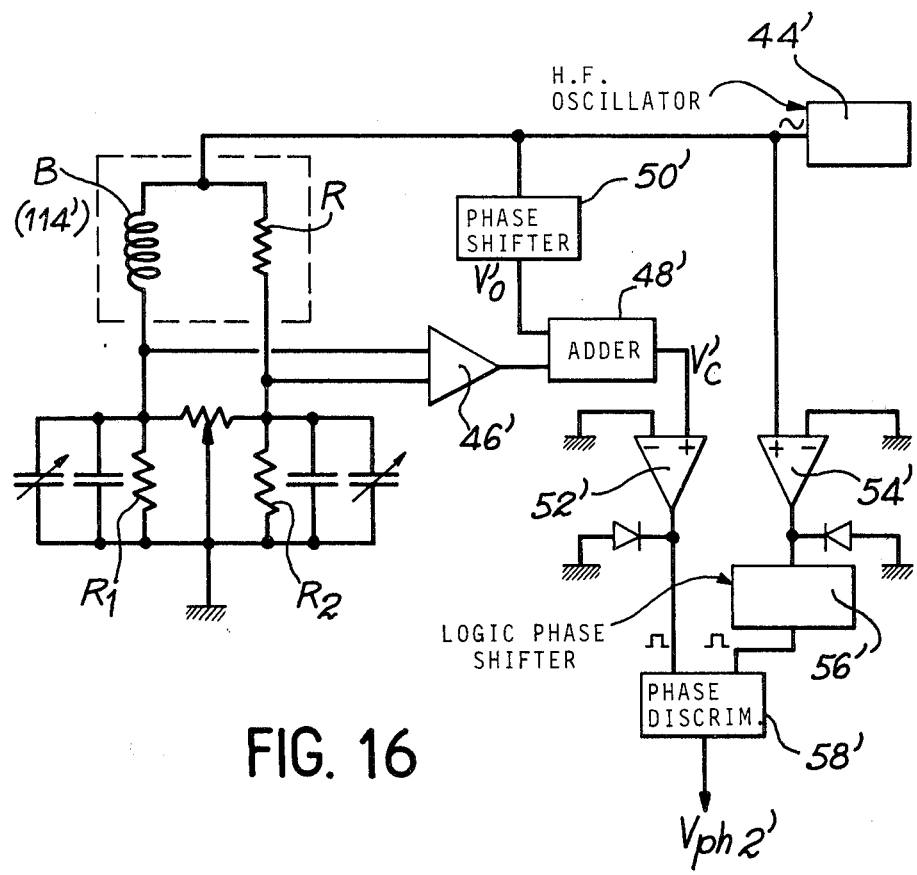
FIG. 16 a circuit which can be associated with an eddy current probe comprising a single coil and serving to detect weld points.
Figure 17:
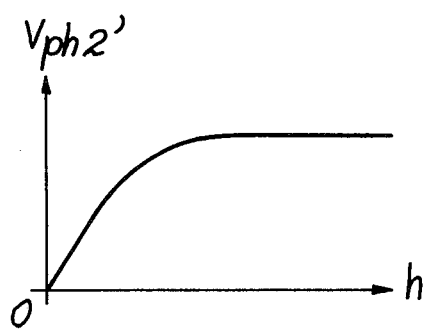
FIG. 17 variations of the signal $V_{ph2}$ transmitted by the processing circuits of FIG. 16 as a function of the distance h separating the probe from the facing surface.

The only feature distinguishing the circuit of FIG. 16 from that of FIG. 3 is that the second coil of the probe is replaced by a resistor R, in such a way that the second signal injected at the input of differential amplifier 46' is a proportional signal and in phase with that of oscillator 44'. The circuit of FIG. 16 permits the performance of a differential phase measurement $V_{ph2}$ between the signal from coil B of the weld point detection probe 114' and the signal transmitted by oscillator 44' used for reference purposes. Thus, a proximity measurement can be performed, i.e. the measurement of the distance h separating coil B from the facing surface, as illustrated in FIG. 17, which shows the variations of signal $V_{ph2}$ as a function of distance h.

It is readily apparent that if coil B of probe 114' is placed in the alignment of the joint on which it is to be centred, signal $V_{ph2}$ represents the distance between the coil and the bottom of the joint. Conversely, as soon as a weld point appears in front of coil B, distance h is very significantly reduced, particularly if probe 114' has been positioned relatively close to the sheets to be welded. Signal $V_{ph2}$ then crosses a predetermined threshold as a function of the positioning of probe 114'. The signal $V_{ps}$ indicating the presence of a weld point is then transmitted by detection circuit 89.

Obviously, the variants described hereinbefore are given in an illustrative and in no way limitative manner. Thus, numerous modifications can be made both in connection with the construction of the welding head and with regards to the configuration and positioning of the probe or probes used, or the processing circuits corresponding thereto. In all cases, the invention ensures a correct and automatic positioning of the welding torch or any other member to be positioned relative to the joint, specifically the joint to be welded, even when the latter has discontinuities of variable length and distributed in a random manner, such as weld points ensuring the prior positioning of the sheets to be welded. It should be noted that the positioning of the welding head is brought about without it being necessary to carry out any prior operation for determining the position of the points.

What is claimed is:

1. A process for the lateral positioning of a member relative to a joint formed between two metal surfaces and having discontinuities and using at least one eddy current probe having a given axis, said process comprising the steps of:
   processing by differential measure a signal supplied by each of said at least one probe, to obtain at least one positioning signal varying with a lateral position of the axis of the said probe relative to an axis of the joint and at least one signal indicating the presence of a discontinuity and generated when the said probe faces a discontinuity of the joint,
   performing a servo-control of the position of said member as a function of variations of said positioning signal, and
   interrupting said servo-control of the position of said member as a function of variations of said positioning signal and replacing said positioning signal by a calculated positioning signal when a signal indicating the presence of a discontinuity is generated.

2. A process according to claim 1, wherein a single eddy current probe is used and said signal indicating the presence of a discontinuity is transmitted between two consecutive peaks of the positioning signal.

3. A process according to claim 1, wherein at least two eddy current probes are used, which are off-set in the direction of the joint.

4. A process according to claim 3, wherein said signal indicating the presence of a discontinuity is transmitted between two consecutive peaks of the positioning signal of a first of said probes, said servo-control of the lateral position of said member being controlled as a function of variations of the positioning signal obtained from a second of said probes.

5. A process according to claim 3, wherein said signal indicating the presence of a discontinuity is transmitted when a difference between said positioning signals obtained from each of said probes exceeds a predetermined threshold.

6. A process according to claim 1, wherein said calculated positioning signal is determined on the basis of variations of said positioning signal before and after said signal indicating the presence of a discontinuity is generated, said servo-control of the lateral position of said member being performed by means of a control signal, which is a function of said positioning signal when there is no signal indicating the presence of a discontinuity and a function of said calculated positioning signal when a signal indicating the presence of a discontinuity is generated.

7. A process according to claim 6, wherein said calculated positioning signal is firstly determined on the basis of variations in said positioning signal during a given period before the transmission of a signal indicating the presence of a discontinuity, and secondly on the basis of variations of said positioning signal during the same period after the end of the transmission of said signal indicating the presence of a discontinuity.

8. An apparatus for the lateral positioning of a member relative to a joint formed between two metal surfaces and having discontinuities comprising: at least one eddy current probe having a given axis, processing means for processing by differential measure signals supplied by each of said at least one probe, said means generating at least one positioning signal which varies with a lateral position of the axis of said probe relative to an axis of the joint, means for detecting a discontinuity generating at least one signal indicating the presence of a discontinuity when said probe faces a discontinuity of the joint, means for performing a servo-control of the position of said member as a function of variations of said positioning signal, means for interrupting said servo-control of the position of said member as a function of variations of said positioning signal, and means for replacing said positioning signal by a calculated positioning signal when a signal indicating the presence of a discontinuity is generated by the means for detecting a discontinuity.

9. An apparatus according to claim 8, comprising a single eddy current probe having two coils arranged symmetrically relative to an axis contained in a plane normal to said surfaces and passing through the axis of the joint, said means for detecting a discontinuity being sensitive to said positioning signal generated by said processing means for generating said signal indicating the presence of a discontinuity between two consecutive peaks of the positioning signal.

10. An apparatus according to claim 8, comprising at least two eddy current probes off-set in the direction of the joint to define a first discontinuity detection probe and a second lateral positioning probe, said second probe having two coils arranged symmetrically relative to an axis contained in a plane normal to said surfaces and passing through the axis of the joint.

11. An apparatus according to claim 10, wherein said discontinuity detection means are sensitive to said positioning signal generated by said processing means for generating said signal indicating the presence of a discontinuity between two consecutive peaks of this positioning signal.

12. An apparatus according to claim 11, wherein said first probe has two coil arranged symmetrically relative to a plane normal to said surfaces and passing through the axis of the joint.

13. An apparatus according to claim 11, wherein said first probe has two coils contained in a plane normal to said surfaces and passing through the axis of the joint, said coils being arranged symmetrically relative to an axis normal to said surfaces and contained in said plane.

14. An apparatus according to claim 10, wherein said discontinuity detection means comprise subtracters determining a difference between said positioning signals transmitted by said means for processing the signals supplied by said first and second probes and means for comparing this difference with a predetermined threshold, the latter means generating said signal indicating the presence of a discontinuity when the difference exceeds the threshold.

15. An apparatus according to claim 8, comprising path calculation means sensitive to the variations of said positioning signal before and after the transmission of a signal indicating the presence of a discontinuity by said discontinuity detection means, for transmitting a calculated positioning signal and control means for laterally displacing said member, said control means being sensitive to said positioning signal and to said calculated positioning signal for transmitting a control signal, which is respectively a function of one or the other of these signals as a function of whether a signal indicating the presence of a discontinuity is or is not generated by said discontinuity detection means.

16. An apparatus according to claim 15, wherein said path calculation means comprise first means for storing variations of said positioning signal during a given period before said transmission of a signal indicating the presence of a discontinuity, second means for the storage of variations of said positioning signal during the same period after the end of the transmission of a signal indicating the presence of a discontinuity, extrapolation means determining a first part of said calculated positioning signal on the basis of variations recorded in the first storage means, and interpolation means determining a second part of said calculated positioning signal on the basis of variations recorded in the first and second storage means.

* * * * *